United States Patent
Zhang et al.

(10) Patent No.: US 12,456,210 B2
(45) Date of Patent: Oct. 28, 2025

(54) SCENE CONTOUR RECOGNITION IN VIDEO BASED ON DEPTH INFORMATION

(71) Applicant: Tencent Technology (Shenzhen) Company Limited, Guangdong (CN)

(72) Inventors: Shenghao Zhang, Shenzhen (CN); Yonggen Ling, Shenzhen (CN); Wanchao Chi, Shenzhen (CN); Yu Zheng, Shenzhen (CN); Xinyang Jiang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 602 days.

(21) Appl. No.: 17/893,007

(22) Filed: Aug. 22, 2022

(65) Prior Publication Data
US 2022/0414910 A1    Dec. 29, 2022

Related U.S. Application Data

(63) Continuation of application No. PCT/CN2021/112058, filed on Aug. 11, 2021.

(30) Foreign Application Priority Data

Aug. 31, 2020 (CN) .................. 202010899315.X

(51) Int. Cl.
*G06T 7/55* (2017.01)
*G06V 10/44* (2022.01)
*G06V 20/10* (2022.01)

(52) U.S. Cl.
CPC .............. *G06T 7/55* (2017.01); *G06V 10/44* (2022.01); *G06V 20/10* (2022.01); *G06T 2207/10024* (2013.01); *G06T 2207/10028* (2013.01)

(58) Field of Classification Search
None
See application file for complete search history.

(56) References Cited

U.S. PATENT DOCUMENTS

| 11,367,271 B2 * | 6/2022 | Hemani | ............... G06V 10/454 |
| 11,715,377 B2 * | 8/2023 | Chen | ............... B60W 30/18163 |
| | | | 701/117 |

(Continued)

FOREIGN PATENT DOCUMENTS

| CN | 106441275 A | 2/2017 |
| CN | 108898661 A | 11/2018 |

(Continued)

OTHER PUBLICATIONS

Chinese Office Action issued Sep. 14, 2023 in Application No. 202010899315.X with English Translation (24 pages).

(Continued)

*Primary Examiner* — Tahmina N Ansari
(74) *Attorney, Agent, or Firm* — ArentFox Schiff LLP

(57) ABSTRACT

A scene contour recognition method is provided. In the method, a plurality of scene images of an environment is obtained. Three-dimensional information of a target plane in the plurality of scene images is determined based on depth information for each of the plurality of scene images, The target plane corresponds to a target object in the plurality of scene images. A three-dimensional contour corresponding to the target object is generated by fusing the target plane in each of the plurality of scene images based on the three-dimensional information of the target plane in each of the (Continued)

plurality of scene images. A contour diagram of the target object is generated by projecting the three-dimensional contour onto a two-dimensional plane.

18 Claims, 7 Drawing Sheets

(56) References Cited

U.S. PATENT DOCUMENTS

| | | | | |
|---|---|---|---|---|
| 11,984,028 | B2* | 5/2024 | Li | G08G 1/0112 |
| 12,086,998 | B2* | 9/2024 | Lang | A61B 34/32 |
| 2020/0394918 | A1* | 12/2020 | Chen | G01C 21/3811 |
| 2022/0414910 | A1* | 12/2022 | Zhang | G06V 10/46 |

FOREIGN PATENT DOCUMENTS

| | | |
|---|---|---|
| CN | 109215111 A | 1/2019 |
| CN | 109961501 A | 7/2019 |
| CN | 110455189 A | 11/2019 |
| CN | 112070782 A | 12/2020 |
| WO | 2014147863 A | 9/2014 |

OTHER PUBLICATIONS

Bodo Rosenhahn et al: "Three-Dimensional Shape Knowledge for Joint Image Segmentation and Pose Tracking", International Journal of Computer Vision, Kluwer Academic Publishers, BO, vol. 73, No. 3, Sep. 25, 2006, pp. 243-262.

Supplementary European Search Report issued Jul. 25, 2023 in Application No. 21860143.3 (8 pages).

International Search Report issued Nov. 11, 2021 in International Application No. PCT/CN2021/112058 with English Translation (6 pages).

Nakashika T, Hori T, Takiguchi T, et al. 3D-object recognition based on LLC using depth spatial pyramid[C], 2014 22nd International Conference on Pattern Recognition. IEEE, 2014: 4224-4228.

Carbonara S, Guaragnella C. Efficient stairs detection algorithm Assisted navigation for vision impaired people[C], 2014 IEEE International Symposium on Innovations in Intelligent Systems and Applications (INISTA) Proceedings. IEEE, 2014: 313-318.

He K, Gkioxari G, Dollar P, et al. Mask r-cnn[C], Proceedings of the IEEE international conference on computer vision. 2017: 2961-2969.

* cited by examiner

SCENE CONTOUR RECOGNITION IN VIDEO BASED ON DEPTH INFORMATION

RELATED APPLICATIONS

The present application is a continuation of International Application No. PCT/CN2021/112058, entitled "METHOD AND APPARATUS FOR IDENTIFYING SCENE CONTOUR, AND COMPUTER-READABLE MEDIUM AND ELECTRONIC DEVICE" and filed on Aug. 11, 2021, which claims priority to Chinese Patent Application No. 202010899315.X, entitled "SCENE CONTOUR RECOGNITION METHOD AND APPARATUS, COMPUTER-READABLE MEDIUM, AND ELECTRONIC DEVICE" and filed on Aug. 31, 2020. The entire disclosures of the prior applications are hereby incorporated by reference in their entirety.

FIELD OF THE TECHNOLOGY

This application relates to the field of image processing technologies, including scene contour recognition technology.

BACKGROUND OF THE APPLICATION

When many automation devices (such as robots, robotic arms, or the like) are running, they need to identify an environment in which they are located, to perform a corresponding processing process based on objects existing in the environment.

In a general technology, a model capable of classifying environmental images is trained in a manner of deep learning, and the foregoing recognition effect can be achieved by using such a model. However, a large quantity of data samples are required by this manner to train the foregoing model, and the training process can be complicated. The model obtained by training is likely to have a large dependence on the data samples, which is likely to cause a problem of inaccurate recognition.

SUMMARY

Embodiments of this disclosure include a scene contour recognition method and apparatus, a non-transitory computer-readable storage medium, and an electronic device, which can improve the accuracy of scene contour recognition and improve the efficiency of scene contour recognition.

According to an aspect of the embodiments of this disclosure, a scene contour recognition method is provided. In the method, a plurality of scene images of an environment is obtained. Three-dimensional information of a target plane in the plurality of scene images is determined based on depth information for each of the plurality of scene images, The target plane corresponds to a target object in the plurality of scene images. A three-dimensional contour corresponding to the target object is generated by fusing the target plane in each of the plurality of scene images based on the three-dimensional information of the target plane in each of the plurality of scene images. A contour diagram of the target object is generated by projecting the three-dimensional contour onto a two-dimensional plane.

According to an aspect of the embodiments of this disclosure, a scene contour recognition apparatus is provided, The scene contour recognition apparatus includes processing circuitry configured to obtain a plurality of scene images of an environment and determine three-dimensional information of a target plane in the plurality of scene images based on depth information for each of the plurality of scene images. The target plane corresponds to a target object in the plurality of scene images. The processing circuitry is configured to generate a three-dimensional contour corresponding to the target object by fusing the target plane in each of the plurality of scene images based on the three-dimensional information of the target plane in each of the plurality of scene images. The processing circuitry is further configured to generate a contour diagram of the target object by projecting the three-dimensional contour onto a two-dimensional plane.

According to an aspect of the embodiments of this disclosure, a non-transitory computer-readable storage medium is provided. The non-transitory computer-readable storage medium stores instructions which when executed by a processor cause the processor to perform the scene contour recognition method according to the foregoing embodiments.

According to an aspect of the embodiments of this disclosure, an electronic device is provided, including: one or more processors; and a storage apparatus, configured to store one or more programs, the one or more programs, when executed by the one or more processors, causing the one or more processors to implement the scene contour recognition method according to the foregoing embodiments.

According to an aspect of the embodiments of this disclosure, a computer program product or a computer program is provided, the computer program product or the computer program including computer instructions, the computer instructions being stored in a computer-readable storage medium. A processor of a computer device reads the computer instructions from the computer-readable storage medium, and the processor executes the computer instructions, to cause the computer device to implement the scene contour recognition method provided in the various optional implementations described above.

In the technical solutions provided by some embodiments of this disclosure, a plurality of scene images corresponding to the ambient environment are obtained, and for each scene image, the three-dimensional information of the target plane corresponding to the target object is determined based on the depth information of the scene image. The amount of data in operation can be greatly reduced by extracting the three-dimensional information, which avoids a massive consumption of computing resources and data delay caused by processing a large amount of image data, improving a real-time performance of scene contour recognition. Then, based on the three-dimensional information of the target plane in each scene image, the three-dimensional contour corresponding to the target object is obtained by fusing the target plane in each scene image. Finally, the schematic contour diagram of the target object is obtained by projecting the three-dimensional contour onto a two-dimensional plane, improving the efficiency and accuracy of scene contour recognition.

DESCRIPTION OF EMBODIMENTS

Figure 1:
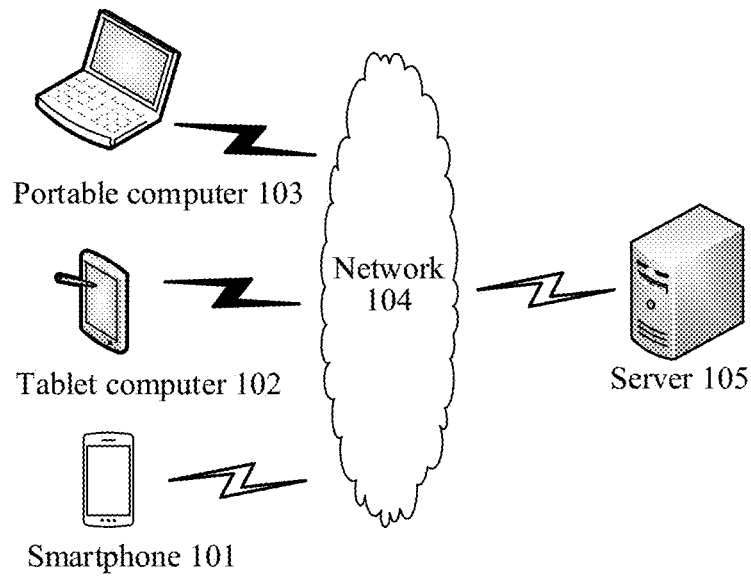
FIG. 1 is a schematic diagram of an exemplary system architecture to which a technical solution according to an embodiment of this disclosure is applicable.

FIG. 1 is a schematic diagram of an exemplary system architecture to which a technical solution according to an embodiment of this disclosure is applicable.

As shown in FIG. 1, the system architecture may include a terminal device (which may be any one or more of a smartphone 101, a tablet computer 102, and a portable computer 103 shown in FIG. 1, or may be a desktop computer, and the like), a network 104, and a server 105. The network 104 is configured to provide a medium of a communication link between the terminal device and the server 105. The network 104 may be a communication link of various connection types, such as a wired communication link, a wireless communication link, or the like.

It is to be understood that the quantity of terminal devices, the quantity of networks, and the quantity of servers in FIG. 1 are merely illustrative. There may be any quantity of terminal devices, any quantity of networks, and any quantity of servers according to an implementation requirement. For example, the server 105 may be a server cluster including a plurality of servers.

A user may interact with the server 105 through the network 104 by using the terminal devices, to receive or send messages. The server 105 may be a server providing various services. For example, the user may use the terminal device 103 (or the terminal device 101 or 102) to upload a plurality of scene images corresponding to an ambient environment to the server 105. After receiving the plurality of scene images corresponding to the ambient environment, the server 105 may determine three-dimensional information of a target plane corresponding to a target object based on the received depth information of each scene image. In addition, a three-dimensional contour corresponding to the target object is obtained by fusing the target plane in each scene image based on the three-dimensional information of the target plane in each scene image. A schematic contour diagram of the target object is generated by projecting the three-dimensional contour onto a two-dimensional plane. In the foregoing manner, problems such as a rapid consumption of computing resources and computing delay caused by simultaneously processing a large amount of image data can be avoided, which can fuse the scene images obtained in real time to obtain an accurate schematic contour diagram corresponding to the target object, improving the efficiency and accuracy of contour recognition of the object in the scene.

The scene contour recognition method provided by embodiments of this disclosure is generally performed by the server 105. However, in other embodiments of this disclosure, the terminal device may also have functions similar to those of the server, thereby performing the scene contour recognition method provided by the embodiments of this disclosure.

Figure 2:
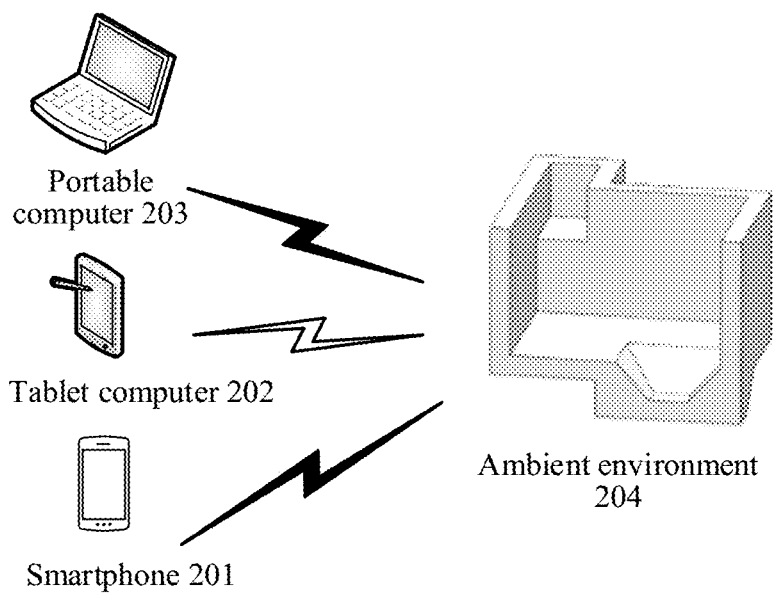
FIG. 2 is a schematic diagram of a system architecture to which a method performed by a terminal device according to an embodiment of this disclosure is applicable.

FIG. 2 is a schematic diagram of a system architecture to which a method performed by a terminal device according to an embodiment of this disclosure is applicable.

As shown in FIG. 2, the system architecture may include a terminal device (one or more of a smartphone 201, a tablet computer 202, and a portable computer 203 as shown in FIG. 2, it can also be a desktop computer, or the like). Scene images corresponding to an ambient environment 204 are obtained by the terminal device. Three-dimensional information of a target plane corresponding to a target object in each scene image is determined based on depth information of each scene image. A three-dimensional contour corresponding to the target object is generated by fusing the target plane in each scene image based on the three-dimensional information of the target plane in each scene image. An accurate schematic contour diagram of the target object is obtained by projecting the three-dimensional contour onto a two-dimensional plane, improving the efficiency and accuracy of the contour recognition in the scene.

In a practical application, in this embodiment, the scene image may be directly obtained through the terminal device, and the contour information of the object in the scene may be recognized, and the corresponding operations may be further performed based on the recognized contour information, improving the efficiency of the recognition of the object in the environment, and further improving the realization efficiency of the related operations performed based on the contour of the object.

Implementation details of technical solutions of embodiments of this disclosure are described below.

Figure 3:
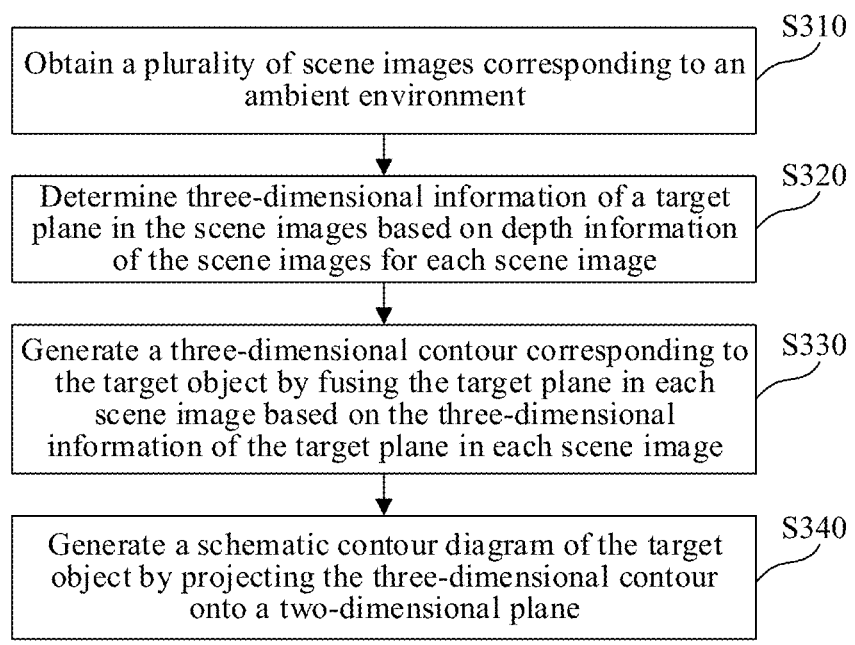
FIG. 3 is a schematic flowchart of a scene contour recognition method according to an embodiment of this disclosure.

FIG. 3 is a flowchart of a scene contour recognition method according to an embodiment of this disclosure. The scene contour recognition method may be performed by a terminal device or a server. The terminal device may be the terminal device shown in FIG. 1, and the server may be the server shown in FIG. 1. Referring to FIG. 3, the scene contour recognition method can include at least step S310 to step S340.

In step S310, a plurality of scene images corresponding to an ambient environment are obtained.

In an embodiment of this disclosure, the scene images of the ambient environment may be obtained by the terminal device. At least two scene images usually need to be obtained in this embodiment. The obtained scene images may correspond to the same area in the ambient environment, or may correspond to different areas in the ambient environment.

In an embodiment of this disclosure, in an application scenario of traveling photographing (that is, a scenario in which a photography device is in a traveling state), the process of obtaining a plurality of scene images corresponding to the ambient environment in step S310 includes the following steps: obtaining photographing parameters, the photographing parameters including a photographing period; and capturing scene images corresponding to each traveling position based on the photographing period in a traveling process, the scene images including a depth map and a color map.

Figure 4:
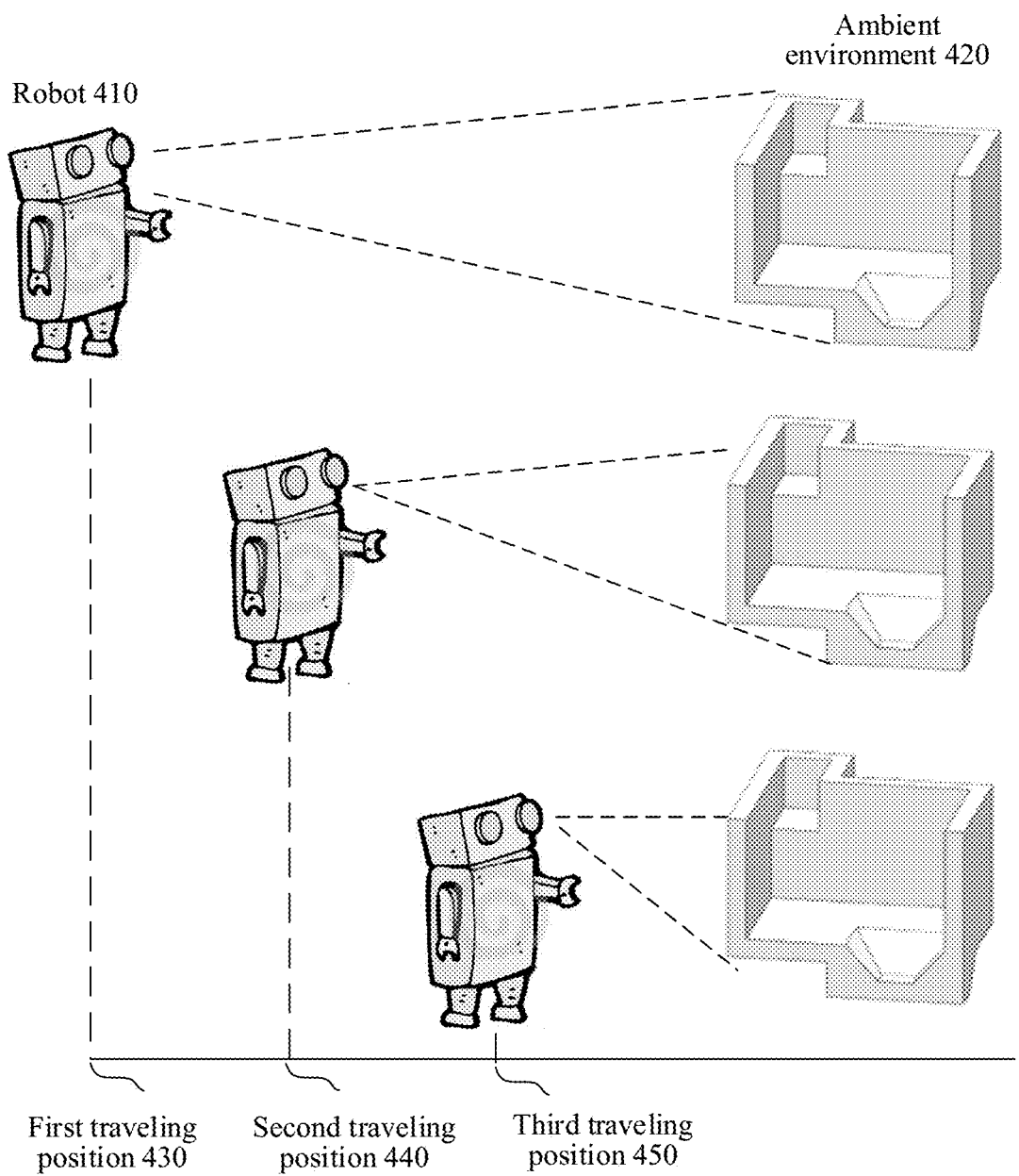
FIG. 4 is a schematic diagram of obtaining a scene image in a traveling process according to an embodiment of this disclosure.

FIG. 4 is a schematic diagram of obtaining a scene image in a traveling process according to an embodiment of this disclosure.

As shown in FIG. 4, the scene image may be obtained by a robot 410. The robot 410 obtains photographing parameters, and performs photographing based on the photographing parameters. The photographing parameters in this embodiment may include information such as a photographing period, a photographing frequency, or the like. In a traveling process of the robot 410, the scene images corresponding to the ambient environment are captured in different traveling positions where the robot is located based on the photographing period. For example, the scene images corresponding to the ambient environment 420 are respectively captured in a first traveling position 430, a second traveling position 440, and a third traveling position 450.

The scene images in this embodiment may be captured by the image capturing apparatus disposed on the robot. The scene images may correspond to a scene in a front field of view of the robot, or may be a plurality of scene images corresponding to a current position of the robot, or may be a circle of images corresponding to the current position of the robot, such as a panoramic image, or the like. In addition, to facilitate the recognition and processing of the image, the scene images in this embodiment may include a depth map and a color map. The depth map may be obtained by performing processing based on the color map, or may be directly captured by a depth camera.

In step S320, for each scene image, three-dimensional information of a target plane in the scene images is determined based on depth information of the scene images. The target plane is a plane corresponding to a target object in the scene images.

In an embodiment of this disclosure, after obtaining each scene image, a target object in each scene image may be determined based on the depth information of each scene image. The target object may be specifically represented by the three-dimensional information of the target plane corresponding to the target object. In the foregoing manner, based on the three-dimensional information of the target plane corresponding to the target object in the scene image, scene information recognizable by a computer device is obtained by processing the target object in the scene.

In an embodiment of this disclosure, the three-dimensional information of the target plane includes a plane equation of the target plane, and three-dimensional coordinates corresponding to points on the target plane. The process of determining the three-dimensional information of the target plane in the scene image based on the depth information of the scene image in step S320 includes the following steps: detecting the target plane in the scene images in a manner of plane fitting based on the depth information of the scene images; and determining the three-dimensional coordinates corresponding to the points on the target plane, and the plane equation of the target plane in a world coordinate system for the target plane in the scene images.

In an embodiment of this disclosure, when computing resources are limited, the size of the amount of data to be computed will have a direct effect on a real-time performance of the algorithm. Therefore, in this embodiment, a plurality of target planes are first extracted from the scene images by a plane fitting algorithm, and then the three-dimensional coordinates corresponding to the points on each target plane and the plane equation of the target plane are determined in a world coordinate system. In this embodiment, the target plane is represented by the three-dimensional coordinates and the plane equation, which can reduce the amount of calculation data, improve the calculation efficiency, and further increase the accuracy of object recognition.

In the embodiments of this disclosure, the identified plane or contour may be represented as a convex polygonal plane with a convex contour, or may be represented as a concave polygonal plane with a concave contour. In this embodiment, a specific object shape in an actual scene is determined by recognizing the concave polygonal plane or the convex polygonal plane in the actual scene, and then a corresponding processing is performed.

In step S330, based on the three-dimensional information of the target plane in each scene image, a three-dimensional contour corresponding to the target object is generated by fusing the target plane in each scene image.

In an embodiment of this disclosure, after obtaining the three-dimensional information of the target plane corresponding to the target object, a three-dimensional contour corresponding to the target object is generated by fusing the target plane in each scene image. Exemplarily, if a certain convex polygonal plane area in the scene is larger, a single convex polygonal contour recognition can only obtain a part of the convex polygonal plane area. A corresponding policy is needed to obtain a more complete convex polygonal area as much as possible. Therefore, in this embodiment, a more complete three-dimensional contour may be obtained by fusing the three-dimensional information of the target plane corresponding to the target object in the plurality of scene images.

Figure 5:
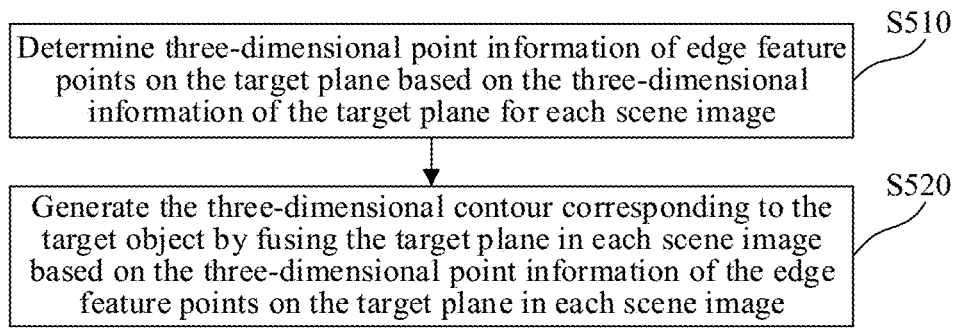
FIG. 5 is a schematic flowchart of generating a three-dimensional contour corresponding to a shape of an object according to an embodiment of this disclosure.

In an embodiment of this disclosure, as shown in FIG. 5, the process of generating a three-dimensional contour corresponding to the target object by fusing the target plane in each scene image based on the three-dimensional information of the target plane in each scene image in step S330 can include step S510 and step S520.

In step S510, for each scene image, the three-dimensional point information of the edge feature points on the target plane is determined based on the three-dimensional information of the target plane.

In an embodiment of this disclosure, considering that a fitted single plane still contains many three-dimensional points, if a large number of three-dimensional points are involved in the calculation, more computing resources will be consumed and the computing efficiency will be affected. In this embodiment, to save computing resources, the edge feature points on each target plane are extracted. Subsequent operations are mainly performed on these edge feature points to ensure a real-time performance of the entire process and improve the computing efficiency.

The edge feature points in this embodiment will, for example all, be projected onto the target plane obtained by fitting in step S320, representing a whole area or a part of the area of the convex polygonal plane corresponding to a current frame.

In step S520, based on the three-dimensional point information of the edge feature points on the target plane in each scene image, the three-dimensional contour corresponding to the target object is generated by fusing the target plane in each scene image.

In an embodiment of this disclosure, data fusion and optimization at a time domain layer start to be considered. The first is a time domain fusion of edge feature points of the plane, and an object of fusion is a plurality of sets of edge feature points corresponding to the same polygonal plane in a time domain process. Based on a result of simultaneous localization and mapping (SLAM), edge feature points at different moments are converted to a coordinate system at a certain moment. In this step, the range of the target polygonal plane is continuously fused in the time domain process, and an obtained result is close to a polygonal area.

Specifically, the process of generating a three-dimensional contour corresponding to the target object by fusing the target plane in each scene image based on the three-dimensional point information of the edge feature points on the target plane in each scene image in step S520 includes: determining a target coordinate system based on a position of an image capturing apparatus at a current moment (that is, an apparatus for capturing the scene images); for the target plane in each scene image, based on the target coordinate system, determining target coordinates of the edge feature points in the target coordinate system according to the three-dimensional point information of the edge feature points on the target plane; and generating a three-dimensional contour corresponding to the target object by fusing the target plane in each scene image based on the target coordinates of the edge feature points on the target plane in each scene image.

Figure 6:
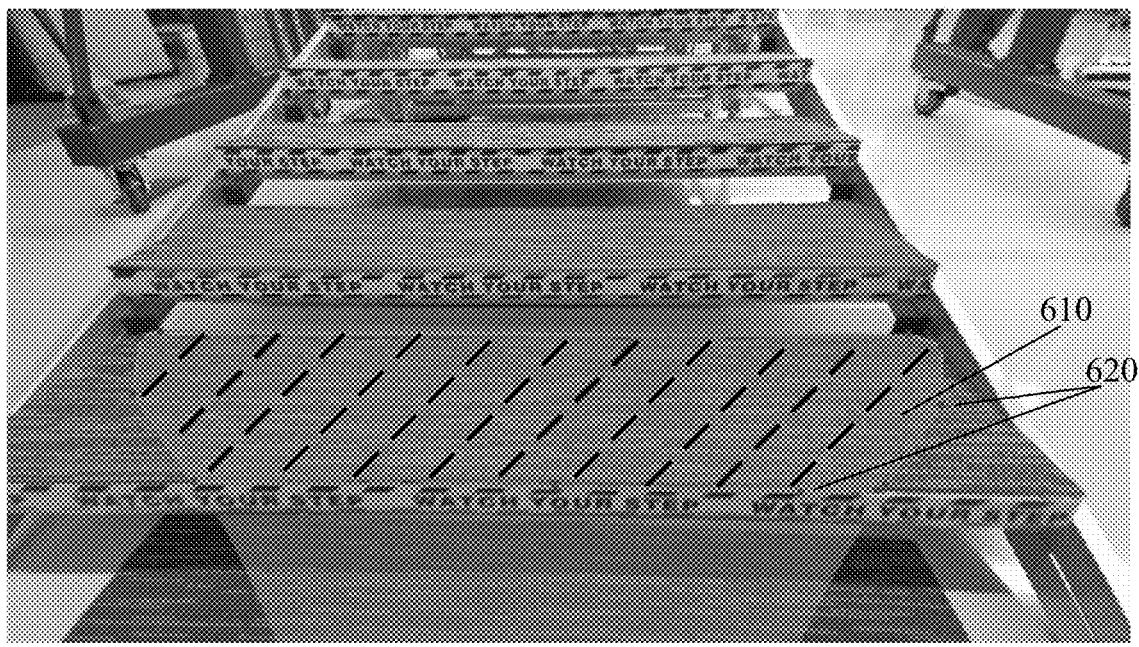
FIG. 6 is a schematic diagram of fusing a plane in a scene image according to an embodiment of this disclosure.
Figure 7:
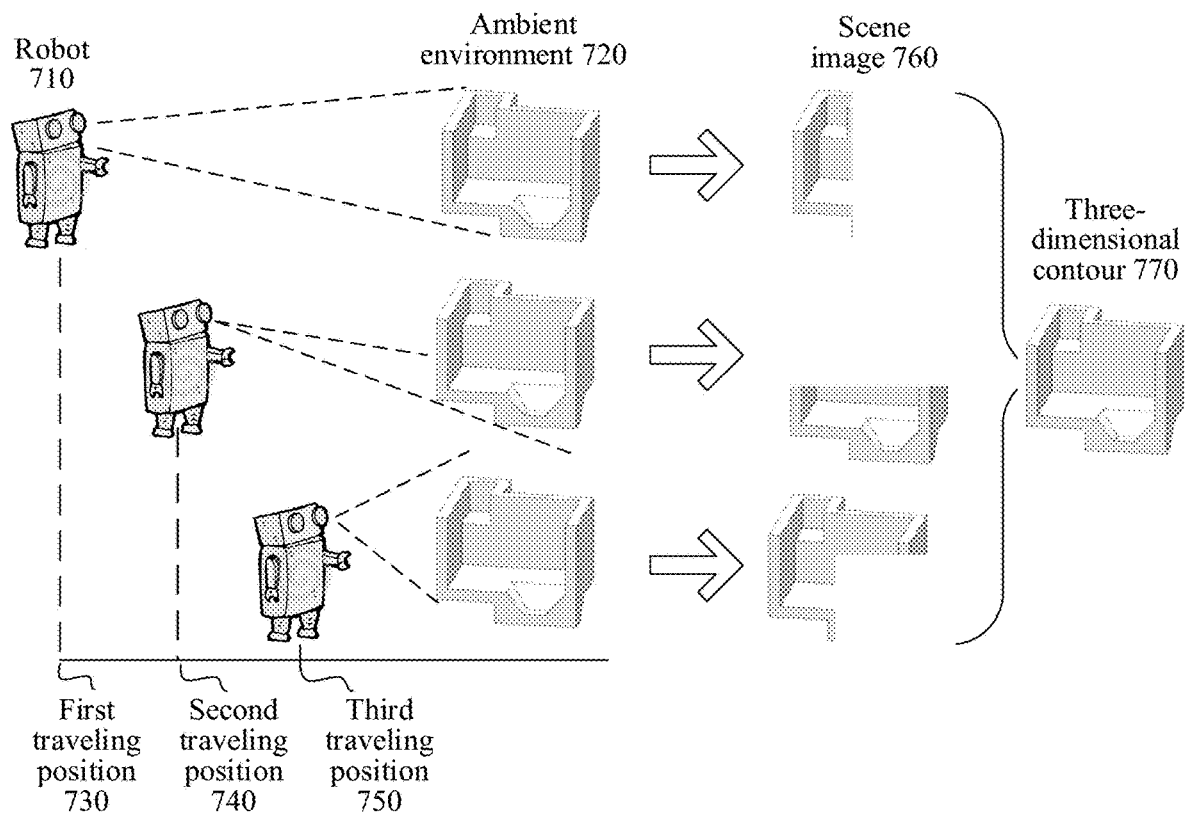
FIG. 7 is a schematic diagram of fusing a plane in a scene image according to an embodiment of this disclosure.

FIG. 6 and FIG. 7 are schematic diagrams of fusing a target plane in a scene image according to an embodiment of this disclosure As shown in FIG. 6, an upper surface of each step may be regarded as a target convex polygonal plane. Different convex polygonal planes are represented by different signs. As shown in FIG. 6, the convex polygonal contour corresponding to a step is represented by a dotted line area 610, and the edge of this area has its corresponding edge feature points 620.

As shown in FIG. 7, since the convex polygonal plane may be larger in a real scene, the field of view of a single scene image cannot cover the entire convex polygonal plane. For example, in FIG. 7, corresponding scene images 760 are respectively obtained in a first traveling position 730, a second traveling position 740, and a third traveling position 750 in a traveling process of a robot 710. The scene images respectively include different areas of the target object. To cope with this case, edge points on each target plane corresponding to the target image in different scene images 760 will be fused in a time domain recognition process. For example, in the traveling process of the robot, a more accurate and complete three-dimensional contour 770 is obtained by fusing the edge points of the same convex polygonal area in the scene images captured at different traveling moments.

Specifically, in this embodiment, a 3D position of the camera (that is, the foregoing image capturing apparatus) in the world coordinate system is estimated in real time by RGBD-based SLAM. The target coordinate system corresponding to a current moment is determined by the position of the camera in the world coordinate system. Then, the three-dimensional information of the edge feature points of the target plane in each scene image is determined based on the target coordinate system, and the target coordinates corresponding to the edge feature points in the target coordinate system are determined. Finally, the three-dimensional contour corresponding to the target object is generated by fusing the target plane in each scene image based on the target coordinates of the edge feature points on the target plane in each scene image. In this embodiment, the three-dimensional information of an object may be synthesized based on a plurality of scene images in the foregoing manner, and then a complete three-dimensional contour corresponding to the object can be obtained, so that the completeness and accuracy of the scene recognition are improved.

In an embodiment of this disclosure, between step S330 and step S340, the following steps are further included: determining an equation corresponding to the target plane based on the three-dimensional information of the target plane; determining a center point of the target plane based on the equation corresponding to the target plane; and adjusting the target plane based on a distance between an optical center of the image capturing apparatus for capturing the scene images and the center point to obtain a three-dimensional contour composed of an adjusted target plane.

In an embodiment of this disclosure, due to a problem of the camera angle, the recognized three-dimensional contour is likely to be distorted and deformed, or the plane position in the three-dimensional contour is likely to be displaced, or the like. Therefore, in this embodiment, a three-dimensional contour composed of the adjusted target plane is obtained by adjusting the target plane in the three-dimensional contour based on the three-dimensional information of the target plane corresponding to an obtained target object.

Specifically, in this embodiment, the equation corresponding to the target plane and the center point are obtained based on the three-dimensional information of the target plane corresponding to the target object. An optimization weight of the three-dimensional contour is determined based on the distance between the optical center of the image capturing apparatus for capturing the scene images and the center point. The optimization weight is inversely proportional to the distance. The optimization weight of the three-dimensional contour corresponding to the obtained scene images in each of the traveling positions is:

$$w_i = \frac{1}{d^2}$$

where d represents the distance between the center point of the plane in the three-dimensional contour or a mean point of the plane and the optical center of the image capturing apparatus.

An optimization parameter corresponding to the plane is determined based on the optimization weight as:

$$c = \frac{w_i c_i}{\sum w_i}$$

where $c_i$ represents a parameter to be optimized.

After obtaining the optimization parameter, a three-dimensional contour composed of the adjusted target plane is obtained by adjusting the target plane based on the optimization parameter. The target plane in the three-dimensional contour is adjusted in the foregoing manner, improving the accuracy of environmental scene recognition.

In step S340, a schematic contour diagram of the target object is generated by projecting the three-dimensional contour onto a two-dimensional plane.

In an embodiment of this disclosure, after obtaining the three-dimensional contour, the three-dimensional contour is projected onto a two-dimensional plane to generate a schematic contour diagram representing a shape of the target object. In addition, the schematic contour diagram is displayed in the scene contour recognition apparatus to instruct the apparatus to perform the corresponding operations.

In an embodiment of this disclosure, when performing projection, the discrete points distributed on each plane in the three-dimensional contour and the three-dimensional coordinates corresponding to the discrete points are first detected. Two-dimensional coordinates corresponding to the discrete points are generated by performing dimension reduction on the three-dimensional coordinates corresponding to the discrete points. The schematic contour diagram of the target object is generated by combining the two-dimensional coordinates corresponding to the discrete points. In this embodiment, the discrete points in the three-dimensional contour are projected onto the two-dimensional plane. In this way, from a two-dimensional perspective, an area enclosed by the contour points of the discrete points is a required target polygonal plane area.

In a practical application, the image capturing apparatus is far away from a certain convex polygonal plane, and an incident angle between the optical center of the image capturing apparatus and the convex polygonal plane is relatively large. In addition, a case in which a plurality of objects are staggered exists in the scene, which is prone to a problem of confusion between the recognition of the objects. In addition, an error of the depth information increases accordingly, and the recognized convex polygonal contour is often wrong, and further optimization is required.

Figure 8:
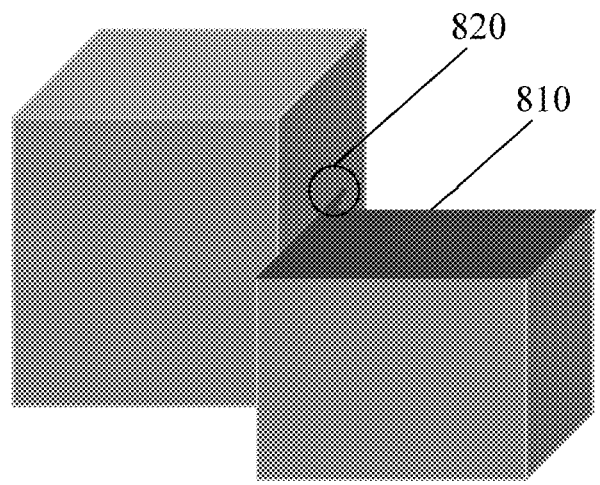
FIG. 8 is a schematic contour diagram according to an embodiment of this disclosure.

FIG. 8 is a schematic contour diagram according to an embodiment of this disclosure.

As shown in FIG. 8, two cubes are taken as an example. In this case, an area 810 is a plane fitting area. It can be seen that the plane fitted on an upper surface of the front cube extends along a side of the rear cube, as shown in an area 820 in FIG. 8. The reason for this phenomenon is that in this case, the error of the depth information is larger, and the plane fitting is wrong.

In an embodiment of this disclosure, to avoid this case, a contour edge corresponding to the schematic contour diagram may be first detected based on discrete points in the schematic contour diagram; a contour range corresponding to the schematic contour diagram may be determined based on the contour edge; and an optimized schematic contour diagram may be obtained by eliminating discrete points outside the contour range based on the contour range.

Figure 9:
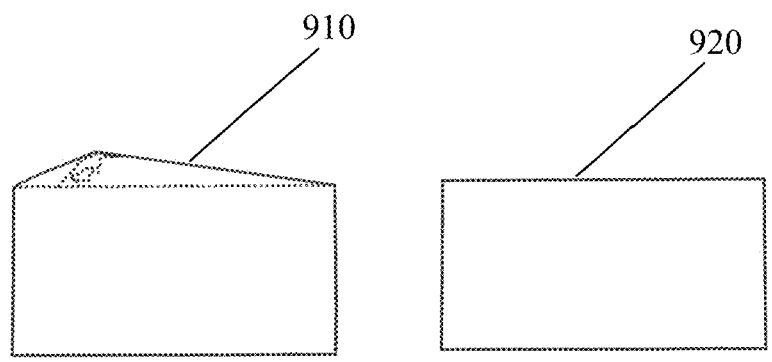
FIG. 9 is a schematic diagram of a recognition result of an optimized plane contour according to an embodiment of this disclosure.

As shown in FIG. 9, the left figure shows a recognition result 910 of the convex polygonal plane contour that outliers exist in the fused three-dimensional contour. The right figure is a result 920 of an optimized convex polygonal plane contour. A specific optimization policy is to traverse the discrete points obtained by the time domain fusion, and detect a contour edge corresponding to the schematic contour diagram; to determine a contour range corresponding to the schematic contour diagram based on the contour edge; to filter out the discrete points that are within the field of view of the camera in a current frame but not within the polygonal plane contour range of the scene image based on the contour range, that is, the outliers; and finally to obtain the optimized schematic contour diagram.

In an embodiment of this disclosure, after the process of generating the schematic contour diagram of the target object by projecting the three-dimensional contour onto a two-dimensional plane in step S340, the following steps are further included:

A position of the target object in a current traveling scenario is determined based on the schematic contour diagram, and an obtaining manner of the target object is determined, where the obtaining manner includes at least one of the following information: an obtaining direction, an obtaining strength, and an obtaining means; and the target object is obtained based on the obtaining manner.

Figure 10:
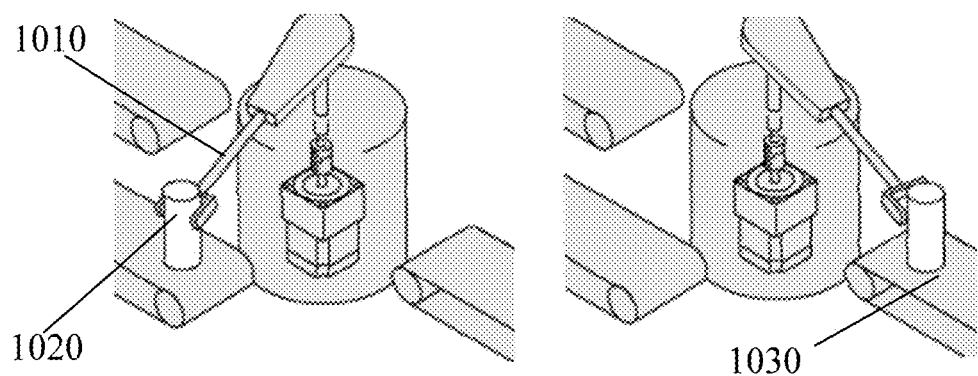
FIG. 10 is a schematic diagram of obtaining a target object according to an embodiment of this disclosure.

FIG. 10 is a schematic diagram of obtaining a target object according to an embodiment of this disclosure.

As shown in FIG. 10, in an embodiment of this disclosure, after recognizing the three-dimensional contour of the target object in the scene, spatial positions of all polygonal planes in the scene can be determined. For a sorting scenario of objects, if the robotic arm 1010 needs to clamp or move a cylindrical or cubic object 1020, the method can provide the size, the orientation, and a position in a three-dimensional space of such an object, and the robotic arm can accurately clamp the target object 1020 based on the visual information.

In an embodiment of this disclosure, the obtaining means may be clamping, sucking, grasping, or the like.

Further, after obtaining the target object, the target object further needs to be placed at a corresponding position. The specific steps are as follows: detecting a schematic contour diagram corresponding to a target placement position 1030 of the target object; determining a placement manner of the target object based on the schematic contour diagram corresponding to the target placement position 1030; and placing the target object at the target placement position 1030 based on the placement manner. A robotic arm places the target object 1020 at a specified plane position in a real scenario, and controls the posture of the object after placement, to avoid a collision between the object and other objects in the environment, and so on.

In an embodiment of this disclosure, after the process of generating a schematic contour diagram of the target object by projecting the three-dimensional contour onto a two-dimensional plane in step S340, the following steps are further included: determining a traveling manner in a current traveling scenario based on the schematic contour diagram, the traveling manner including at least one of the following information: a traveling direction, a traveling height, and a traveling distance; and performing a traveling task based on the traveling manner.

In an embodiment of this disclosure, for a mobile robot, such as a legged robot, if difficult scenes such as steps, plum blossom piles, or slates exist in the movement process, this method can provide the robot with a precise landing area in real time, preventing the robot from stepping in the air or a foot end from colliding with an object in the scene. In addition, landing area information may make it convenient for the robot to complete a more proper landing point selection or path planning.

Figure 11:
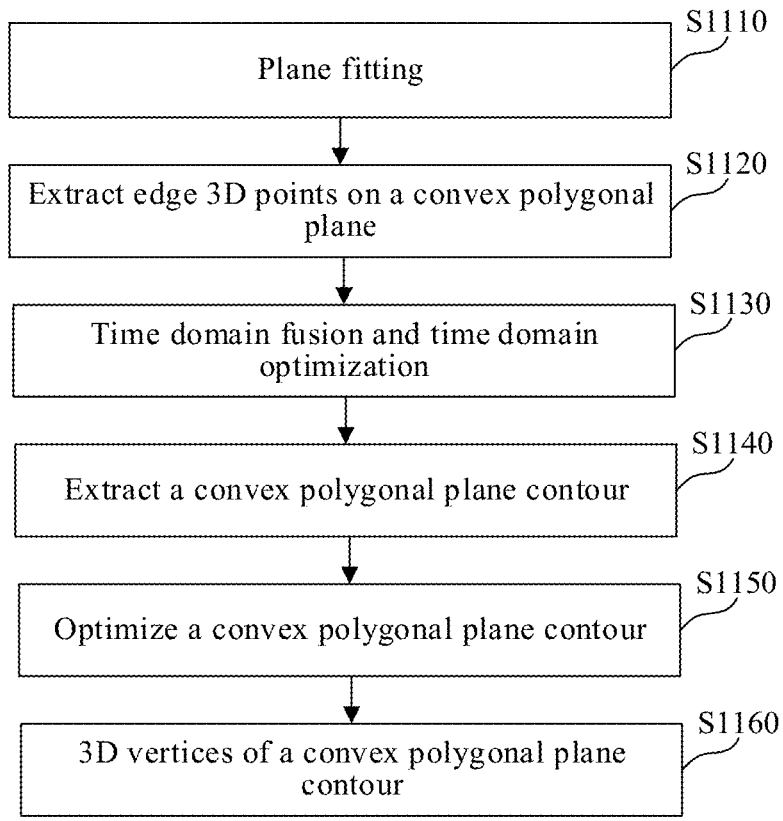
FIG. 11 is a schematic flowchart of a scene contour recognition method according to an embodiment of this disclosure.

FIG. 11 is a flowchart of a scene contour recognition method according to an embodiment of this disclosure.

As shown in FIG. 11, in step S1110, a convex polygonal plane is obtained by performing plane fitting on the obtained scene image. In step S1120, edge feature points are obtained by extracting edge 3D points on the convex polygonal plane. Through the extraction of the polygonal plane contour, the amount of data in the operation is greatly reduced, so that the algorithm can recognize the polygonal plane contour in the video in real time. In step S1130, based on the edge feature points, the time domain fusion and optimization are performed for the plane, so that a final polygonal contour is more complete and accurate. In step S1140, the convex polygonal plane contour is extracted. In step S1150, the convex polygonal plane contour is optimized, greatly mitigating the effect of wrong fitting of the plane on the polygonal contour recognition. In step S1160, based on the projection of the 3D vertices of the convex polygonal plane contour, the corresponding schematic contour diagram is obtained, taking both the real-time performance and accuracy into account, so that the final scene rendering effect is more accurate and real-time.

The following describes apparatus embodiments of this disclosure, which can be used for performing the scene contour recognition method in the foregoing embodiments of this disclosure. It is to be understood that the apparatus may be a computer program (including program code) run on a computer device. For example, the apparatus is application software, and the apparatus may be configured to perform the corresponding steps in the method provided in the embodiments of this disclosure. For details not disclosed in the apparatus embodiments of this disclosure, reference may be made to the foregoing embodiments of the scene contour recognition method of this disclosure.

Figure 12:
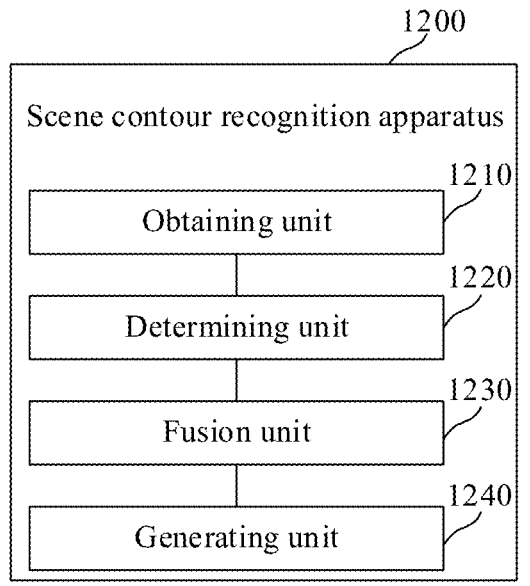
FIG. 12 is a schematic block diagram of a scene contour recognition apparatus according to an embodiment of this disclosure.

FIG. 12 is a block diagram of a scene contour recognition apparatus according to an embodiment of this disclosure. One or more modules, submodules, and/or units of the apparatus can be implemented by processing circuitry, software, or a combination thereof, for example.

As shown in FIG. 12, the scene contour recognition apparatus 1200 according to an embodiment of this disclosure includes: an obtaining unit 1210, configured to obtain a plurality of scene images corresponding to an ambient environment; a determining unit 1220, configured to determine three-dimensional information of a target plane corresponding to a target object in the scene images based on depth information of the scene images for each scene image; a fusion unit 1230, configured to generate a three-dimensional contour corresponding to the target object by fusing the target plane in each scene image based on the three-dimensional information of the target plane in each scene image; and a generating unit 1240, configured to generate a schematic contour diagram of the target object by projecting the three-dimensional contour onto a two-dimensional plane.

In some embodiments of this disclosure, based on the foregoing solutions, the three-dimensional information of the target plane includes the plane equation of the target plane and the three-dimensional coordinates corresponding to points on the target plane. The determining unit 1220 is further configured to: detect the target plane in the scene images in a manner of plane fitting based on the depth information of the scene images; and determine the three-dimensional coordinates corresponding to the points on the target plane, and the plane equation of the target plane in a world coordinate system for the target plane in the scene images.

In some embodiments of this disclosure, based on the foregoing solutions, the fusion unit 1230 includes: an edge feature subunit, configured to determine the three-dimensional point information of the edge feature points on the target plane based on the three-dimensional information of the target plane for each scene image; and an edge fusion subunit, configured to generate the three-dimensional contour corresponding to the target object by fusing the target plane in each scene image based on the three-dimensional point information of the edge feature points on the target plane in each scene image.

In some embodiments of this disclosure, based on the foregoing solutions, the edge fusion subunit is further configured to: determine a target coordinate system based on a position of an image capturing apparatus at a current moment, the image capturing apparatus being an apparatus for capturing the scene images; for the target plane in each scene image, based on the target coordinate system, determine target coordinates of the edge feature points in the target coordinate system according to the three-dimensional point information of the edge feature points on the target plane; and generate a three-dimensional contour corresponding to the target object by fusing the target plane in each scene image based on the target coordinates of the edge feature points on the target plane in each scene image.

In some embodiments of this disclosure, based on the foregoing solutions, the scene contour recognition apparatus 1200 further includes: a plane equation unit, configured to determine an equation corresponding to the target plane based on the three-dimensional information of the target plane; a center determining unit, configured to determine a center point of the target plane based on the equation corresponding to the target plane; and an adjustment unit, configured to adjust the target plane based on a distance between an optical center of the image capturing apparatus for capturing the scene images and the center point to obtain a three-dimensional contour composed of the adjusted target plane.

In some embodiments of this disclosure, based on the foregoing solutions, the adjustment unit is further configured to: determine an optimization weight of the three-dimensional contour based on the distance between the optical center of the image capturing apparatus for capturing the scene images and the center point, the optimization weight being inversely proportional to the distance; and determine an optimization parameter corresponding to the target plane based on the optimization weight, adjust the target plane based on the optimization parameter, and obtain a three-dimensional contour composed of the adjusted target plane.

In some embodiments of this disclosure, based on the foregoing solutions, the generating unit 1240 is further configured to: detect the discrete points distributed on each plane in the three-dimensional contour, and the three-dimensional coordinates corresponding to the discrete points; generate the two-dimensional coordinates corresponding to the discrete points by performing dimension reduction on the three-dimensional coordinates corresponding to the discrete points; and generate the schematic contour diagram of the target object by combining the two-dimensional coordinates corresponding to the discrete points.

In some embodiments of this disclosure, based on the foregoing solutions, the scene contour recognition apparatus 1200 further includes: a discrete point unit, configured to detect a contour edge corresponding to the schematic contour diagram based on discrete points in the schematic contour diagram; a range determining unit, configured to determine a contour range corresponding to the schematic contour diagram based on the contour edge; and an eliminating unit, configured to obtain an optimized schematic contour diagram by eliminating discrete points outside the contour range based on the contour range.

In some embodiments of this disclosure, based on the foregoing solutions, the obtaining unit 1210 is further configured to: obtain photographing parameters, the photographing parameters including a photographing period; and capture scene images corresponding to each traveling position based on the photographing period in a traveling process, the scene images including a depth map and a color map.

In some embodiments of this disclosure, based on the foregoing solutions, the scene contour recognition apparatus 1200 further includes: an information obtaining unit, configured to determine an obtaining manner of the target object based on a position of the target object corresponding to the schematic contour diagram in a current traveling scenario, the obtaining manner including at least one of the following information: an obtaining direction, an obtaining strength, and an obtaining means; and a traveling photographing unit, configured to obtain the target object based on the obtaining manner.

In some embodiments of this disclosure, based on the foregoing solutions, the scene contour recognition apparatus 1200 further includes: a detection unit, configured to detect a schematic contour diagram corresponding to a target placement position of the target object; a manner determining unit, configured to determine a placement manner of the target object based on the schematic contour diagram corresponding to the target placement position; and a placement unit, configured to place the target object at the target placement position based on the placement manner.

In some embodiments of this disclosure, based on the foregoing solutions, the scene contour recognition apparatus 1200 further includes: a traveling manner unit, configured to determine a traveling manner in a current traveling scenario based on the schematic contour diagram, the traveling manner including at least one of the following information: a traveling direction, a traveling height, and a traveling distance; and a traveling unit, configured to perform a traveling task based on the traveling manner.

Figure 13:
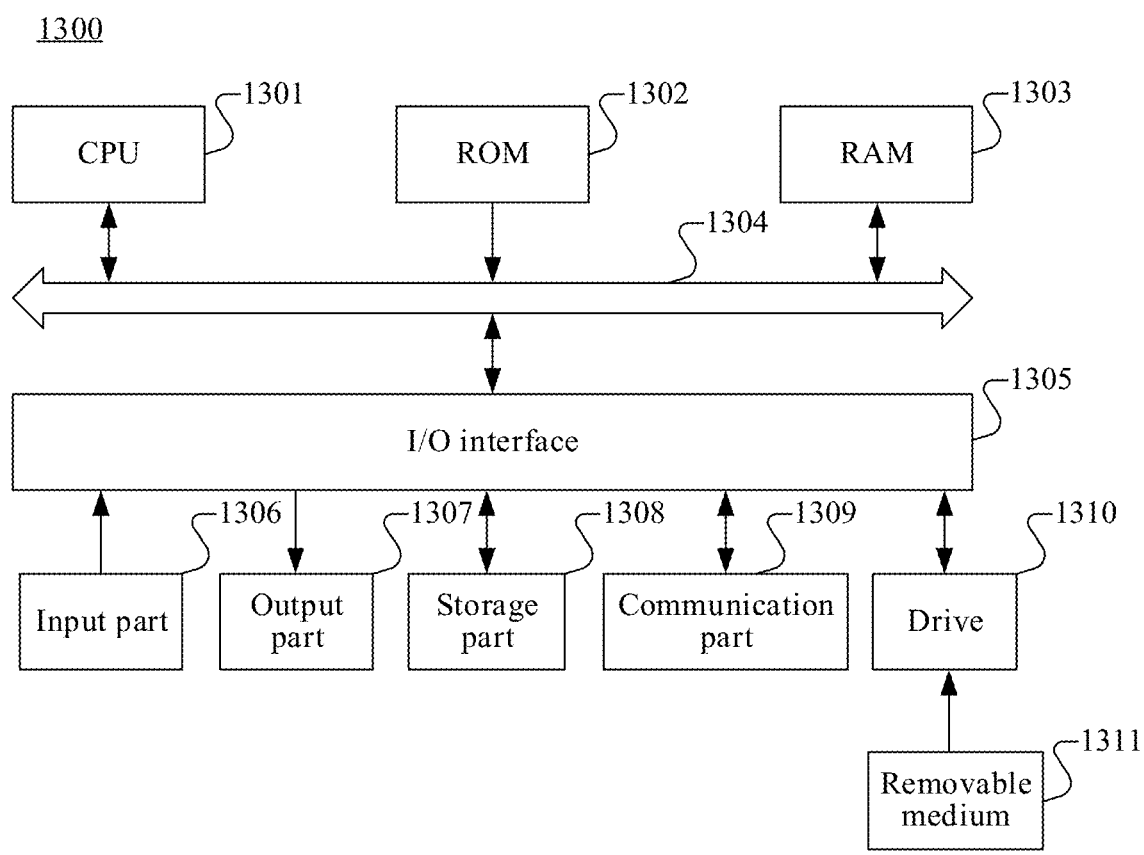
FIG. 13 is a schematic structural diagram of a computer system adapted to implement an electronic device according to an embodiment of this disclosure.

FIG. 13 is a schematic structural diagram of a computer system adapted to implement an electronic device according to an embodiment of this disclosure.

A computer system 1300 of an electronic device shown in FIG. 13 is only an example, which is not to impose any limitation on the function and scope of use of the embodiments of this disclosure.

As shown in FIG. 13, the computer system 1300 includes processing circuitry such as a central processing unit (CPU) 1301, which can execute various appropriate actions and processing according to a program stored in a read-only memory (ROM) 1302 or a program loaded from a storage part 1308 to a random access memory (RAM) 1303, such as performing the methods described in the foregoing embodiments. The RAM 1303 further stores various programs and data required for operating the system. The CPU 1301, the ROM 1302, and the RAM 1303 are connected to each other through a bus 1304. An input/output (I/O) interface 1305 is also connected to the bus 1304.

The following components are connected to the I/O interface 1305: an input part 1306 including a keyboard, a mouse, or the like; an output part 1307 including a cathode ray tube (CRT), a liquid crystal display (LCD), a speaker, or the like; a storage part 1308 including a hard disk or the like; and a communication part 1309 including a network interface card such as a local area network (LAN) card, a modem, or the like. The communication part 1309 performs communication processing by using a network such as the Internet. A drive 1310 is also connected to the I/O interface 1305 as required. A removable medium 1311, such as a magnetic disk, an optical disc, a magneto-optical disk, or a semiconductor memory, is installed on the drive 1310 as required, so that a computer program read from the removable medium is installed into the storage part 1308 as required.

Particularly, according to an embodiment of the present disclosure, the processes described above by referring to the flowcharts may be implemented as computer software programs. For example, an embodiment of this disclosure includes a computer program product. The computer program product includes a computer program stored in a computer-readable medium. The computer program includes a computer program used for performing a method shown in the flowchart. In such an embodiment, the computer program may be downloaded and installed through the communication part 1309 from a network, and/or installed from the removable medium 1311. When the computer program is executed by the CPU 1301, the various functions defined in the system of this disclosure are executed.

The computer-readable medium shown in the embodiments of this disclosure may be a computer-readable signal medium or a computer-readable storage medium or any combination of the two. The computer-readable storage medium may be, for example, but is not limited to, an electrical, magnetic, optical, electromagnetic, infrared, or semiconductor system, apparatus, or device, or any combination thereof. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In this disclosure, the computer-readable storage medium may be any tangible medium or a non-transitory computer-readable storage medium containing or storing a program, and the program may be used by or used in combination with an instruction execution system, an apparatus, or a device. In this disclosure, a computer-readable signal medium may include a data signal in a baseband or propagated as a part of a carrier wave, the data signal carrying a computer-readable computer program. A data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The computer program included in the computer-readable medium may be transmitted by using any suitable medium, including but not limited to: a wireless medium, a wire, or the like, or any suitable combination thereof.

According to an aspect of this disclosure, a computer program product or a computer program is provided, including computer instructions, the computer instructions being stored in a computer-readable storage medium. A processor of a computer device reads the computer instructions from the computer-readable storage medium, and the processor executes the computer instructions, to cause the computer device to implement the method provided in the various implementations described above.

According to another aspect, this disclosure further provides a computer-readable medium. The computer-readable medium may be included in the electronic device described in the foregoing embodiments, or may exist alone and is not disposed in the electronic device. The computer-readable medium carries one or more programs, the one or more programs, when executed by the electronic device, causing the electronic device to implement the method described in the foregoing embodiments.

What is claimed is:

1. A scene contour recognition method, the method comprising:
   obtaining a plurality of scene images of an environment;
   determining three-dimensional (3D) information of a target plane in the plurality of scene images based on depth information for each of the plurality of scene images, the target plane corresponding to a target object in the plurality of scene images, the 3D information of the target plane including a plane equation of the target plane and 3D coordinates corresponding to points on the target plane;
   generating a 3D contour corresponding to the target object by fusing the target plane in each of the plurality of scene images based on the 3D information of the target plane in each of the plurality of scene images; and
   generating a contour diagram of the target object by projecting the 3D contour onto a two-dimensional (2D) plane, wherein
   the determining the 3D information of the target plane includes:
      detecting the target plane in the plurality of scene images with plane fitting based on the depth information of the plurality of scene images; and
      determining the 3D coordinates corresponding to the points on the target plane, and the plane equation of the target plane in a world coordinate system for the target plane in the plurality of scene images.

2. The method according to claim 1, wherein the generating the 3D contour comprises:
   determining 3D point information of edge feature points on the target plane based on the 3D information of the target plane for each of the plurality of scene images; and
   generating the 3D contour corresponding to the target object by fusing the target plane in each of the plurality of scene images based on the 3D point information of the edge feature points on the target plane in each of the plurality of scene images.

3. The method according to claim 2, wherein the generating the 3D contour corresponding to the target object comprises:
   determining a target coordinate system based on a position of an image capturing apparatus at a current time, the image capturing apparatus being configured to capture the plurality of scene images;
   determining target coordinates of the edge feature points in the target coordinate system according to the 3D point information of the edge feature points on the target plane, for the target plane in each of the plurality of scene images based on the target coordinate system; and
   generating the 3D contour corresponding to the target object by fusing the target plane in each of the plurality of scene images based on the target coordinates of the edge feature points on the target plane in each of the plurality of scene images.

4. The method according to claim 1, further comprising:
   determining an equation corresponding to the target plane based on the 3D information of the target plane;
   determining a center point of the target plane based on the equation corresponding to the target plane; and
   obtaining a 3D contour of an adjusted target plane by adjusting the target plane based on a distance between an optical center of an image capturing apparatus configured to capture the plurality of scene images and the center point.

5. The method according to claim 4, wherein the obtaining the 3D contour of the adjusted target plane comprises:
   determining an optimization weight of the 3D contour based on the distance between the optical center of the image capturing apparatus and the center point, the optimization weight being inversely proportional to the distance;
   determining an optimization parameter corresponding to the target plane based on the optimization weight;
   adjusting the target plane based on the optimization parameter; and
   obtaining the 3D contour of the adjusted target plane.

6. The method according to claim 1, wherein the generating the contour diagram of the target object comprises:
   detecting discrete points distributed on each plane in the 3D contour, and 3D coordinates corresponding to the discrete points;
   generating 2D coordinates corresponding to the discrete points by performing dimension reduction on the 3D coordinates corresponding to the discrete points; and
   generating the contour diagram of the target object by combining the 2D coordinates corresponding to the discrete points.

7. The method according to claim 1, wherein after the generating the contour diagram of the target object, the method further comprises:
   detecting a contour edge corresponding to the contour diagram based on discrete points in the contour diagram;
   determining a contour range corresponding to the contour diagram based on the contour edge; and
   obtaining an optimized contour diagram by eliminating discrete points outside the contour range based on the contour range.

8. The method according to claim 1, wherein the obtaining the plurality of scene images comprises:
   obtaining photographing parameters including a photographing period; and
   capturing the plurality of scene images corresponding to each traveling position based on the photographing period in a traveling process, the plurality of scene images including a depth map and a color map.

9. The method according to claim 1, wherein after the generating the contour diagram of the target object, the method further comprises:
   determining an obtaining manner of a robotic device to obtain the target object based on a position of the target object corresponding to the contour diagram in a current traveling scenario; and
   obtaining the target object based on the obtaining manner.

10. The method according to claim 9, further comprising:
    detecting a contour diagram corresponding to a target placement position of the target object;
    determining a placement manner of the robotic device to place the target object based on the contour diagram corresponding to the target placement position; and
    placing the target object at the target placement position based on the placement manner.

11. The method according to claim 1, wherein after the generating the contour diagram of the target object, the method further comprises:
    determining a traveling manner in a current traveling scenario based on the contour diagram, the traveling manner including at least one of a traveling direction, a traveling height, and a traveling distance; and
    performing a traveling task based on the traveling manner.

12. A scene contour recognition apparatus, comprising:
processing circuitry configured to:
obtain a plurality of scene images of an environment;
determine three-dimensional (3D) information of a target plane in the plurality of scene images based on depth information for each of the plurality of scene images, the target plane corresponding to a target object in the plurality of scene images, the 3D information of the target plane including a plane equation of the target plane and 3D coordinates corresponding to points on the target plane;
generate a 3D contour corresponding to the target object by fusing the target plane in each of the plurality of scene images based on the 3D information of the target plane in each of the plurality of scene images; and
generate a contour diagram of the target object by projecting the 3D contour onto a two-dimensional (2D) plane, wherein
the determination of the 3D information of the target plane includes:
detecting the target plane in the plurality of scene images with plane fitting based on the depth information of the plurality of scene images; and
determining the 3D coordinates corresponding to the points on the target plane, and the plane equation of the target plane in a world coordinate system for the target plane in the plurality of scene images.

13. The scene contour recognition apparatus according to claim 12, wherein the processing circuitry is configured to:
determine 3D point information of edge feature points on the target plane based on the 3D information of the target plane for each of the plurality of scene images; and
generate the 3D contour corresponding to the target object by fusing the target plane in each of the plurality of scene images based on the 3D point information of the edge feature points on the target plane in each of the plurality of scene images.

14. The scene contour recognition apparatus according to claim 13, wherein the processing circuitry is configured to:
determine a target coordinate system based on a position of an image capturing apparatus at a current time, the image capturing apparatus being configured to capture the plurality of scene images;
determine target coordinates of the edge feature points in the target coordinate system according to the 3D point information of the edge feature points on the target plane, for the target plane in each of the plurality of scene images based on the target coordinate system; and
generate the 3D contour corresponding to the target object by fusing the target plane in each of the plurality of scene images based on the target coordinates of the edge feature points on the target plane in each of the plurality of scene images.

15. The scene contour recognition apparatus according to claim 12, wherein the processing circuitry is configured to:
determine an equation corresponding to the target plane based on the 3D information of the target plane;
determine a center point of the target plane based on the equation corresponding to the target plane; and
obtain a 3D contour of an adjusted target plane by adjusting the target plane based on a distance between an optical center of an image capturing apparatus configured to capture the plurality of scene images and the center point.

16. The scene contour recognition apparatus according to claim 15, wherein the processing circuitry is configured to:
determine an optimization weight of the 3D contour based on the distance between the optical center of the image capturing apparatus and the center point, the optimization weight being inversely proportional to the distance;
determine an optimization parameter corresponding to the target plane based on the optimization weight;
adjust the target plane based on the optimization parameter; and
obtain the 3D contour of the adjusted target plane.

17. The scene contour recognition apparatus according to claim 12, wherein the processing circuitry is configured to:
detect discrete points distributed on each plane in the 3D contour, and 3D coordinates corresponding to the discrete points;
generate 2D coordinates corresponding to the discrete points by performing dimension reduction on the 3D coordinates corresponding to the discrete points; and
generate the contour diagram of the target object by combining the 2D coordinates corresponding to the discrete points.

18. A non-transitory computer-readable storage medium, storing instructions which when executed by a processor cause the processor to perform:
obtaining a plurality of scene images of an environment;
determining three-dimensional (3D) information of a target plane in the plurality of scene images based on depth information for each of the plurality of scene images, the target plane corresponding to a target object in the plurality of scene images, the 3D information of the target plane including a plane equation of the target plane and 3D coordinates corresponding to points on the target plane;
generating a 3D contour corresponding to the target object by fusing the target plane in each of the plurality of scene images based on the 3D information of the target plane in each of the plurality of scene images; and
generating a contour diagram of the target object by projecting the 3D contour onto a two-dimensional (2D) plane, wherein
the determining the 3D information of the target plane includes:
detecting the target plane in the plurality of scene images with plane fitting based on the depth information of the plurality of scene images; and
determining the 3D coordinates corresponding to the points on the target plane, and the plane equation of the target plane in a world coordinate system for the target plane in the plurality of scene images.

* * * * *